United States Patent [19]

DuCorday

[11] Patent Number: 4,457,585
[45] Date of Patent: Jul. 3, 1984

[54] MAGNIFIER READER

[76] Inventor: Gerard M. DuCorday, 10871 Thorley Rd., Santa Ana, Calif. 92705

[21] Appl. No.: 297,980

[22] Filed: Aug. 31, 1981

[51] Int. Cl.³ .................. G02B 27/02; G02B 7/04; G02B 3/08
[52] U.S. Cl. .................. 350/235; 350/239; 350/245; 350/255; 350/452
[58] Field of Search .................. 350/114-116, 350/235-251, 255, 452, 143; D16/134-136, 101; 40/361

[56] References Cited

U.S. PATENT DOCUMENTS

| | | | |
|---|---|---|---|
| 1,518,419 | 12/1924 | Styll | D16/135 |
| 2,051,791 | 8/1936 | Luce | D16/135 |
| 2,143,431 | 1/1939 | Benzinger | 350/249 |
| 2,340,421 | 2/1944 | Obrist | 350/239 |
| 2,441,747 | 5/1948 | Beshgetoor | D16/135 |
| 2,630,631 | 3/1953 | McMullen | 350/250 |
| 3,140,883 | 7/1964 | Anthony | 350/452 |
| 3,744,882 | 7/1973 | Forster, Jr. | 350/241 |
| 3,753,610 | 8/1973 | Samuel | 350/452 |
| 4,022,186 | 5/1977 | Northrup, Jr. | 350/452 |
| 4,099,851 | 7/1978 | Rethore | 350/246 |
| 4,259,784 | 4/1981 | MacPherson | 350/114 |

FOREIGN PATENT DOCUMENTS

| | | | |
|---|---|---|---|
| 2846072 | 4/1980 | Fed. Rep. of Germany | 350/114 |
| 410524 | 5/1910 | France | 350/255 |
| 83015 | 6/1980 | Japan | 350/452 |
| 871488 | 6/1961 | United Kingdom | 350/235 |
| 1220802 | 1/1971 | United Kingdom | 350/239 |
| 1531731 | 11/1978 | United Kingdom | 350/239 |

OTHER PUBLICATIONS

Cooke, F., "Aid to Viewing Test Plate Interference Fringes", App. Optics, 9-1971, pp. 2216-2217.
Photocopies of photographs, FIGS. 1 through 6.

Primary Examiner—William H. Punter
Attorney, Agent, or Firm—Gausewitz, Carr, Rothenberg & Edwards

[57] ABSTRACT

A clear, transparent, rigid plastic sheet is bent into an inverted U-shape to provide a top supported by continuous transparent legs. A fresnel lens, coextensive with the top, is secured to the top or actually formed in one of its surfaces to provide a hand-free, self-supporting large area magnifier capable of use in reading a complete printed page with little or no shifting of the magnifier. For various scientific and other purposes, scales, grids, or other reference marks or patterns are carried on transparent elements secured to the bottoms of the legs where they are likewise magnified for counting or measuring or other large area analysis, or study of a full page or document being read.

5 Claims, 12 Drawing Figures

U.S. Patent    Jul. 3, 1984    Sheet 2 of 2    4,457,585
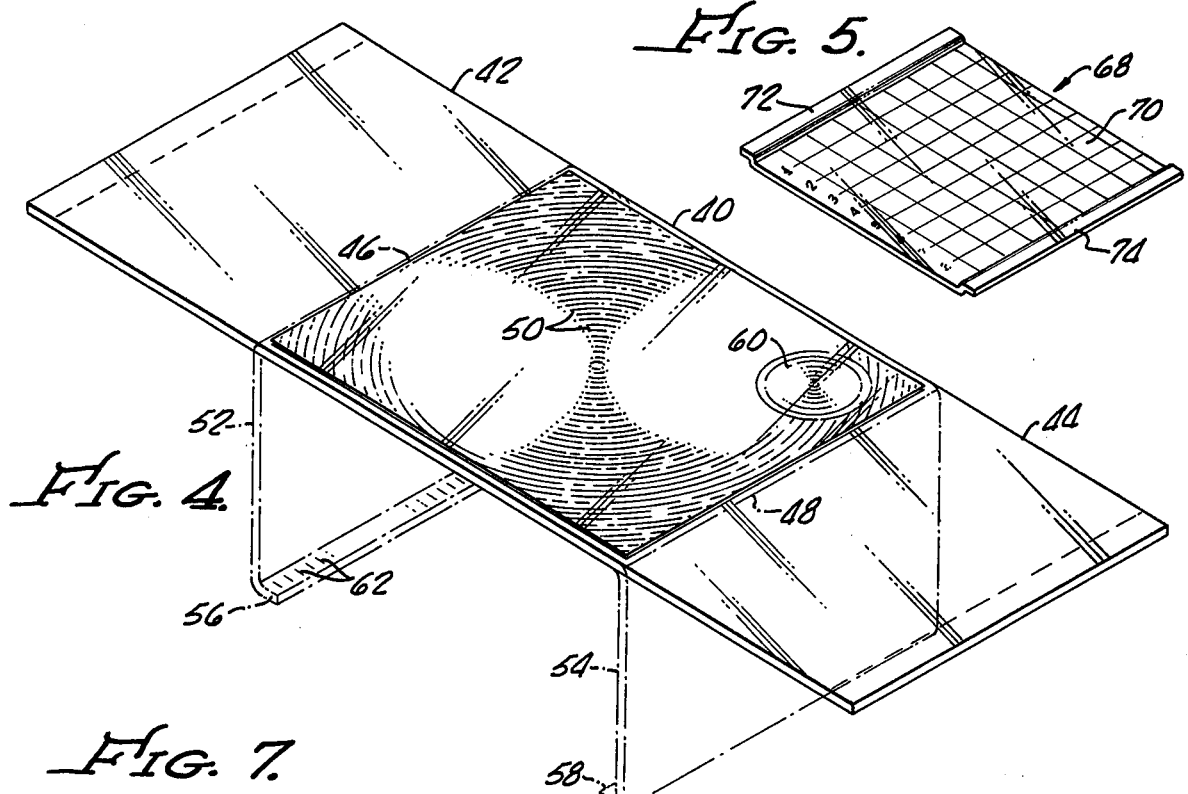
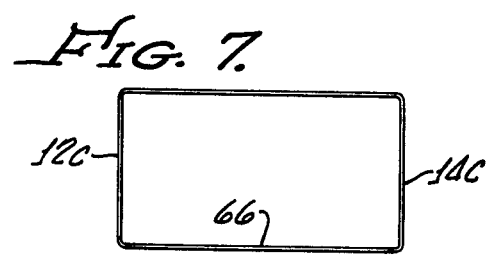
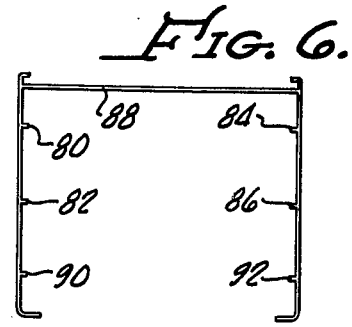
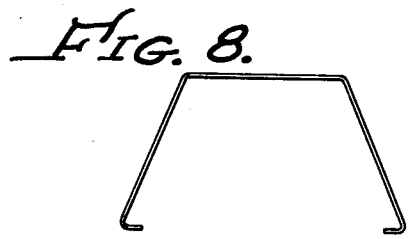
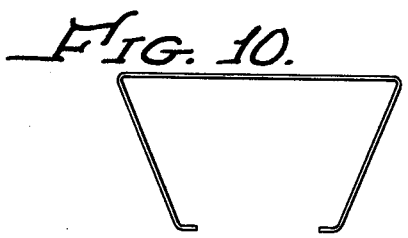

MAGNIFIER READER

BACKGROUND OF THE INVENTION

The present invention relates to reading aids, and more particularly concerns a full-page magnifier that makes maximum use of ambient light and requires a minimum of operator contact and control.

Difficulties in clearly seeing small print or fine configurations are frequently overcome by use of eyeglasses or other magnifying devices. Magnifying lenses of various types have been mounted on self-supporting frames, often also carrying a light for improved illumination. Such lenses are generally of small size and useful only for viewing relatively small objects without continually moving the object relative to the magnifying lens. Size of such magnifier is generally limited by the economies involved in making a larger lens. Accordingly, such arrangements are far too small for convenient reading use, as in reading a book, newspaper or magazine, for example.

Magnifying aids available for use in reading a book, newspaper or magazine are hand-held, requiring continuous support and manipulation by the user. They also require careful control of distance from the page being read in order to maintain a reasonably constant amount of magnification. Even so, such magnifiers are far too small for the reading of a full page without substantially continuous motion of the apparatus over the page.

The fresnel lens is a lens formed by a surface consisting of a concentric series of simple lens sections so that a thin lens with a short focal length and large diameter is possible. Such a lens is often used in a device such as an overhead slide projector, for example. Fresnel lenses are made on thin, transparent plastic sheeting of rigid optical grade acrylic or flexible commercial grade vinyl. Some have been made for home magnification use, but have no support other than the user's hand and, therefore, are difficult, if not impossible, to hold in a fixed position for any length of time. Two hands of the user are required to hold such a device and reading becomes difficult, uncomfortable and tiresome. Lack of a fixed support will result in apparent continuous motion of the reading matter, which motion, and also related distortion, are further amplified by bending and twisting of the hand-held plastic sheet. Problems arising from the lack of steady support are aggravated by the fact that many persons requiring such magnifying arrangements for reading often have other physical problems.

Accordingly, it is an object of the present invention to provide a page reading magnifier that eliminates or avoids above-mentioned problems.

SUMMARY OF THE INVENTION

In carrying out principles of the present invention, in accordance with a preferred embodiment thereof, a magnifier reader is formed of a top member adapted to be positioned parallel to and fixedly spaced from the page of a document to be read. Transparent legs connected to the top member support it at a fixed distance from a page to be read and permit unobstructed transmission of ambient light to the page. A fresnel lens is secured to and substantially co-extensive with the top member, both the lens and the top member being substantially co-extensive with the page to be read.

BRIEF DESCRIPTION OF THE DRAWINGS

FIG. 4 shows a reader magnifier in which the lens is formed integrally with the support;

FIG. 5 illustrates an insert bearing useful indicia capable of being connected with the configuration of FIGS. 1 or 4;

FIG. 6 shows a modification providing adjustable magnification; and

FIGS. 7 through 12 illustrate various alternative configurations of the magnifier reader of the present invention.

BRIEF DESCRIPTION OF THE PREFERRED EMBODIMENTS OF THE INVENTION

Figure 1:
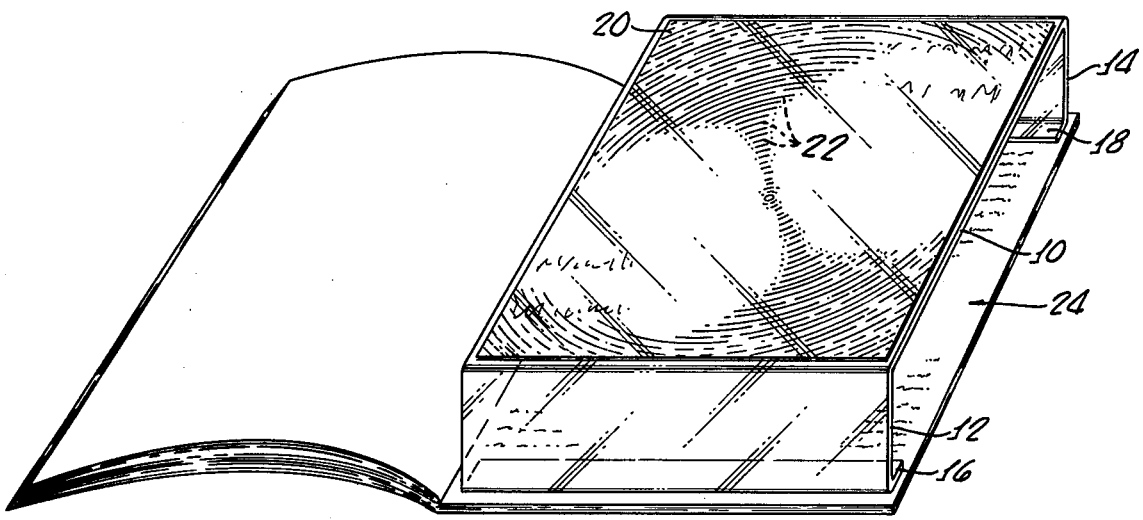
FIG. 1 illustrates one embodiment of the present invention in place for reading a book.

As illustrated in FIG. 1, a page reader magnifier embodying principles of the present invention may comprise a substantially inverted U-shaped frame, formed of a transparent plastic, having a planar top member 10 and first and second sides or legs 12, 14. The free end of each leg is turned inwardly to provide a continuous full width flange, indicated respectively at 16 and 18. All parts of the U-shaped frame are formed of a rigid, clear, transparent and flat plastic. Preferably, the top member, both legs, and leg flanges, are all formed integrally and bent from a single sheet of plastic. Alternatively, for compact packaging and for convenience in storage and handling, the legs may be hingedly connected to the top member or detachably, though rigidly, connected thereto.

Secured to the upper surface of the top member and substantially completely co-extensive therewith, is a rectangular sheet of transparent plastic material 20, on one surface of which are formed a plurality of concentric grooves 22 collectively defining a fresnel lens. The lens bearing sheet 20 may be secured to the top member 10 by many different arrangements. It is presently preferred to employ a thin peripheral bead of transparent adhesive to secure the lens sheet 20 to the upper surface of the top member 10. Preferably, the lens forming grooves 22 face downwardly so that the groove-bearing surface of sheet 20 will be in contact with the upper surface of top 20 and protected thereby. It will be readily understood that sheet 20 alternatively may be bonded or otherwise fixedly secured to the lower surface of sheet 10, with the lens forming grooves facing either downwardly or upwardly.

The leg flanges 16, 18 allow the magnifier reader to be readily supported on a page of an open book, generally indicated at 24, of which the pages may be as large as 7 inches by 9 inches or 8 inches by 10 inches, for example. For use with a book of such size, the top member 10 and lens sheet 20 are both made with corresponding dimensions, each being 8 inches by 10 inches, so that the lens will be substantially co-extensive with the full page of the book to be read.

Fresnel lenses are produced in various focal lengths. For optimum daylight transmission, the focal length of the fresnel lens is generally made to roughly equal the diameter of the largest of the concentric circles on the lens sheet itself. Where the magnifier reader may be used in the presence of sunlight, it is highly desirable to prevent the device from focusing sun rays upon the surface supporting the magnifier because a lens of such a size is capable of producing enough heat at its focal point to ignite combustible materials and objects in an exceedingly short time. Accordingly, in the example given, the height of the legs is made approximately 5 inches, being only about half of the 10 inch focal distance of this lens (the distance required to pinpoint the sun's rays) and rendering the lens thereby harmless. This height is determined by the length of the legs 12, 14. In a presently preferred embodiment, having legs of about 5 inches in height, the lens is designed to provide a clear image magnified from one and a half to two times, at a distance of about 10 inches to 14 inches above the page, which is the approximate eye level of a reader sitting at a table upon which the book being read is resting.

It will be seen that the broad flanges at the bottom of the legs of the magnifier facilitate support of the device upon books of different sizes and enable ready shifting of the device, if necessary, some distance toward the top or bottom of a page. It has been found that an 8 inch by 10 inch lens may be employed to read the entire contents of printed matter on an 8 inch by 10 inch page in one position of the magnifier, and without moving the magnifier from such one position. Preferably, the magnifier is placed so as to symmetrically and optimally cover the entire page, and the reader may simply view the page through the magnifier moving his head as necessary, although at times it may be convenient to shift the magnifier by a small amount to read topmost or bottommost lines of print that may be positioned close to the top or bottom edges of the page.

Because the entire support and, in particular, all of the legs of the support, are of transparent material, the disclosed magnifier reader makes maximum use of ambient light. No supplementary light source need be employed nor mounted upon the magnifier, as is required in many prior devices. The user's hands are entirely free. The position of the magnifier with respect to (above) the page is fixed so that the magnification will remain the same, and the page being read is readily accessible from the sides of the magnifier for marking, noting, underlining, and the like.

Thus, the described magnifier reader is an inexpensive, uncomplicated, easy-to-use, mass-producable, lightweight, large area magnifier and an exceedingly efficient and versatile full-page reading device capable of greatly benefiting the visually handicapped and others.

Figure 2:
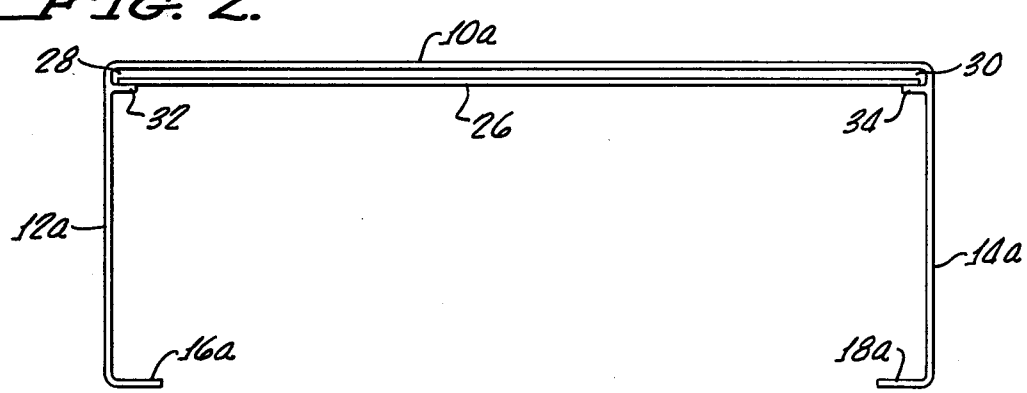
FIGS. 2 and 3 illustrate modifications of the arrangement of FIG. 1.

Illustrated in FIG. 2 is an alternative arrangement of the magnifier of FIG. 1 in which a fresnel lens bearing sheet 26 has its ends slidably and detachably received in inwardly facing guideways 28, 30, formed by the undersurface of the top member 10a, and inwardly projecting ribs 32, 34 on upper parts of legs 12a, 14a. This arrangement is also formed with integral legs having inwardly projecting flanges or feet 16a, 18a.

Figure 3:
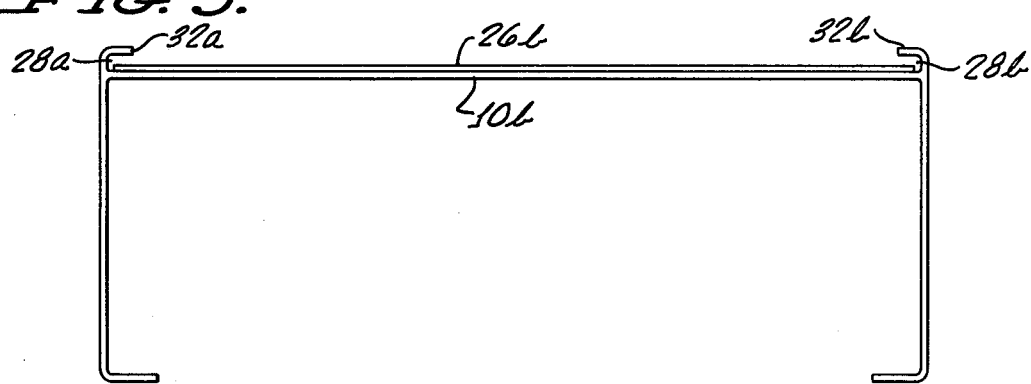

The arrangement of FIG. 2 may be modified as shown in FIG. 3 to provide guideways 28a and 28b, formed between the upper surface of top member 10b, and inwardly projecting flanges or ribs 32a, 32b. This arrangement provides a complete and continuous support for the lens bearing sheet 10b which is detachably and slidably secured within the guideways, and thus a thinner, more flexible material may be employed for the lens sheet in this configuration.

FIG. 4 illustrates a further simplified magnifier reader, presently preferred for the simple method of its manufacture. In this embodiment, a rigid, flat, transparent sheet of material is divided into an intermediate portion 40 and two oppositely disposed outer portions 42, 44, which are separated from the intermediate portion along mutually spaced and parallel lines 46, 48 that extend completely across the sheet. Concentric grooves 50, defining a fresnel lens, are formed in either the upper or lower surface (preferably the lower surface as shown in FIG. 4). Outer portions 42, 44 are then bent at right angles to the central or intermediate portion 40 to provide legs 52, 54, of which the end edges 56, 58 may also be bent inwardly to provide enlarged area supporting feet for the device.

If desired, a limited area, such as area 60 of the intermediate portion 40, may be formed with a portion of a fresnel lens of different magnification, such as greater magnification, for inspection of smaller detail.

The arrangement of FIG. 4 simplifies manufacturing. It eliminates the steps of providing supporting elements for a separate fresnel lens and eliminates the steps of positioning the lens upon a support and making the connection between lens sheet and support. Further, the proper position of the lens on the support is permanently assured.

The described magnifier readers may be employed for a variety of uses other than simple reading of a page. Such other uses include many different technical applications involved with production, study and analysis of drawings, patterns, objects and specimens in science, medical, x-ray and laboratory technology, geological, biological, archeological studies, architecture and engineering, map-reading and navigation, industrial assembly and inspection, graphic arts, advertising, display, and many more. For certain technical applications, it may be desirable to form indicia generally indicated at 62 on the surfaces of one or both of the legs 56, 58 to provide a scale or other reference for counting, measurement and analysis. Such indicia are magnified by the lens together with the object or document being viewed.

Where a given document such as a map or the like is to be viewed through a specific grid or pattern, the lower ends of supporting legs 12c, 14c, as indicated in FIG. 7, may be interconnected by a solid, transparent bottom plate 66 on which is imprinted the desired grid or pattern, or the like. Alternatively, as shown in FIG. 5, a detachable and replaceable insert 68 may be employed with the open legged arrangements of FIGS. 1 through 4 and 6 through 12. Such insert comprises a continuous, transparent bottom plate 70 upon which is imprinted or otherwise fixed a desired design, grid or pattern, and a pair of upwardly spaced, outwardly projecting flanges 72, 74 that will slidably overlie the inwardly projecting leg flanges, such as flanges 16, 18 or FIG. 1, or flanges 56, 58 of FIG. 4. This arrangement allows the bottom of the grid bearing plate 70 to rest directly upon the document being observed.

As previously described, both the document being observed and the grid or pattern on the bottom plate 70 will be magnified by the lens. Insert 68 may be one of a number of interchangable inserts, each with a different type or scale of grid or pattern.

Where different degrees of magnification are required, each leg may be formed with a number of spaced inwardly projecting ribs 80, 82, 84, 86, 90, 92 positioned below the top member 88 (see FIG. 6). Accordingly, fresnel lens sheets may be positioned at selectively adjustable distances above the surface to be viewed, thus providing selectively varying amounts of focal distance and magnification.

Although legs extending normal to the plane of the member are presently preferred, it will be readily appreciated that the legs may diverge outwardly, as shown in FIGS. 8 and 9, with foot flanges projecting either inwardly or outwardly, or, the legs may converge downwardly, as shown in FIG. 10. The arrangements of FIGS. 8 and 9, and in particular FIG. 9, readily adapt themselves to ease of handling and transport because configurations can be stacked one on top of the other. The arrangement of FIG. 10 may be employed where the magnifier is to be used to concentrate the sun's rays for heating a small area or sensitizing a photo voltaic cell or the like. In such an arrangement, a provision will be made to raise the top member and lens plate above the surface to be treated to or near the full focal length of the lens, either by lengthening the legs of the device or providing an additional device-raising support.

As illustrated in FIGS. 11 and 12, the top support and the lens bearing sheet themselves need not be planar, but may be either convex or concave, or even undulating, for further variation of magnification. Such a light gathering, bending, focusing and heating arrangement has a wide variety of further applications in graphic arts and design, photography, merchandise showcasing, store display, as well as in emergency, military, or outdoor use for light or heat amplification, and other areas where concentrated sunlight or heat are useful.

The arrangement of FIG. 7 can be modified by entirely omitting one of the legs 12c, 14c whereby a book or other document to be magnified may readily be inserted from any one of three sides.

There have been described a number of devices and methods for their manufacture providing a simple, inexpensive highly efficient and effective page reader and magnifier capable of being readily manufactured in the full page size, and readily operable in ambient light without the use of hands to provide a fixed positioning with respect to the object being viewed.

The foregoing detailed description is to be clearly understood as given by way of illustration and example only, the spirit and scope of this invention being limited solely by the appended claims.

I claim:

1. A clear, portable, one-piece, page size, and self-supporting magnifier reader comprising
   a substantially page size top member adapted to be positioned parallel to and fixedly spaced from a page of a document to be read, said top member being formed of a rigid, clear, transparent, and flat member,
   first and second legs joined to said top member for supporting said top member at a predetermined distance from and upon said page to be read, said legs being transparent for unobstructed transmission of ambient light to said page, the upper ends of said legs being coextensive with front and back edges respectively of said top member and forming therewith an inverted U-shaped and fully transparent rigid frame, and
   a Fresnel lens formed in and substantially coextensive with said top member, whereby a magnified image of said page may be read solely with ambient light and with minimum movement of said reader over said page,
   said top member and legs being formed of an integral sheet of flat plastic having an intermediate portion and first and second opposite outer portions, said intermediate portion forming said top member, said first and second outer portions forming said legs and being bent relative to said intermediate portion along mutually spaced parallel lines defining outer portions of said top member,
   said intermediate portion of said plastic sheet having a plurality of grooves formed therein, said grooves collectively forming said Fresnel lens, whereby said lens is an integral part of said magnifier reader,
   said legs each having a free end portion bent to extend at an angle relative to such leg to provide an extended foot therefor, said foot being provided with indicia useful in reading a page with said magnifier reader, the image of said indicia viewed through said lens being magnified thereby.

2. A clear, portable, page size, and self-supporting magnifier reader comprising
   a substantially page size top member adapted to be positioned parallel to and fixedly spaced from a page of a document to be read, said top member being formed of a rigid, clear, transparent, and flat member,
   first and second legs connected to said top member for supporting said top member at a predetermined distance from and upon said page to be read, said legs being transparent for unobstructed transmission of ambient light to said page, the upper ends of said legs being coextensive with and directly connected to front and back edges respectively of said top member and forming therewith an inverted U-shaped and fully transparent rigid frame, and
   a Fresnel lens detachably secured to and substantially coextensive with said top member, said lens comprising a flat sheet substantially coextensive with said top member, whereby a magnified image of said page may be read solely with ambient light and with minimum movement of said reader over said page,
   said legs each being formed with a plurality of lens support ribs mutually spaced along the length of the leg, said lens being detachably supported upon a selected pair of said support ribs whereby said lens may be adjustably positioned in said reader to adjust the focal distance and magnification thereof.

3. A clear, portable, page size, and self-supporting magnifier reader comprising
   a substantially page size top member adapted to be positioned parallel to and fixedly spaced from a page of a document to be read, said top member being formed of a rigid, clear, transparent, and flat member,
   first and second legs joined to said top member for supporting said top member at a predetermined distance from and upon said page to be read, said legs being transparent for unobstructed transmission of ambient light to said page, the upper ends of said legs being coextensive with front and back edges respectively of said top member and forming therewith an inverted U-shaped and fully transparent rigid frame, and
   a Fresnel lens detachably secured to and substantially coextensive with said top member, whereby a magnified image of said page may be read solely with ambient light and with minimum movement of said reader over said page, said lens being adjustably secured to said top member at different distances therefrom.

4. A clear, portable, one-piece, page size, and self-supporting magnifier reader comprising a substantially page size top member adapted to be positioned parallel to and fixedly spaced from a page of a document to be read, said top member being formed of a rigid, clear, transparent, and flat member, first and second legs joined to said top member for supporting said top member at a predetermined distance from and upon said page to be read, said legs being transparent for unobstructed transmission of ambient light to said page, the upper ends of said legs being coextensive with front and back edges respectively of said top member and forming therewith an inverted U-shaped and fully transparent rigid frame, and a Fresnel lens formed in and substantially coextensive with said top member, whereby a magnified image of said page may be read solely with ambient light and with minimum movement of said reader over said page, said lens having a diameter considerably greater than the height of said legs, whereby the focal point of said lens is spaced from a plane containing ends of said legs.

5. The method of making a portable, page size, and self-supporting magnifier reader comprising dividing an elongated, rigid, rectangular plastic sheet into an intermediate portion and first and second end portions adjoining said intermediate portion along mutually spaced lines extending completely across said sheet, forming a Fresnel lens in said intermediate portion of said transparent plastic sheet, bending said first and second end portions along said lines to extend rigidly in the same direction from said intermediate portion, whereby said first and second end portions form rigid transparent legs for supporting said intermediate portion and the lens formed therein directly upon and at a fixed distance from a page of a document to be read, further bending the free ends of each of said sheet end portions inwardly to provide inwardly projecting, enlarged supporting feet to firmly support the magnifier reader upon a document to be read, and forming indicia on said supporting feet so as to project a magnified image of said indicia through said Fresnel lens.

* * * * *